No. 722,063. PATENTED MAR. 3, 1903.
W. O. WEBSTER.
MOTOR SUSPENSION.
APPLICATION FILED DEC. 4, 1902.
NO MODEL. 2 SHEETS—SHEET 1.
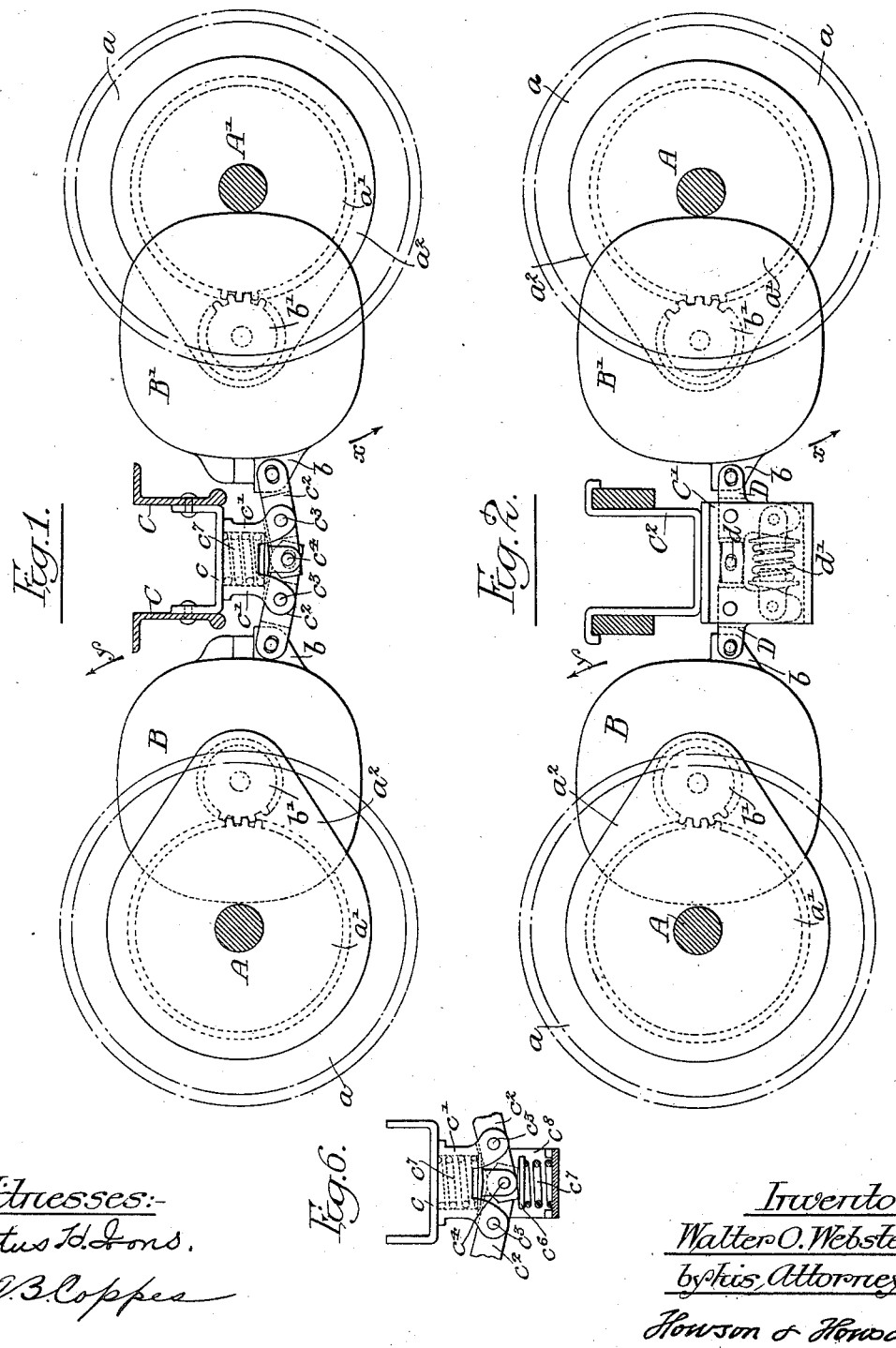
Witnesses:-
Titus H. Irons.
A. B. Coppes
Inventor:
Walter O. Webster,
by his Attorneys
Howson & Howson No. 722,063. PATENTED MAR. 3, 1903.
W. O. WEBSTER.
MOTOR SUSPENSION.
APPLICATION FILED DEC. 4, 1902.
NO MODEL. 2 SHEETS—SHEET 2.

Witnesses:—
Titus Id. Irons.
A. B. Coppes

Inventor:—
Walter O. Webster,
by his Attorneys;
Howson & Howson

UNITED STATES PATENT OFFICE.

WALTER O. WEBSTER, OF PHILADELPHIA, PENNSYLVANIA, ASSIGNOR TO BURNHAM, WILLIAMS & COMPANY, OF PHILADELPHIA, PENNSYLVANIA, A FIRM.

MOTOR SUSPENSION.

SPECIFICATION forming part of Letters Patent No. 722,063, dated March 3, 1903.

Application filed December 4, 1902. Serial No. 133,914. (No model.)

*To all whom it may concern:*

Be it known that I, WALTER O. WEBSTER, a citizen of the United States, residing in Philadelphia, Pennsylvania, have invented certain Improvements in Motor Suspension, of which the following is a specification.

My invention consists in an improved suspension for electric motors, having for its object the provision of a device for yieldingly supporting the free ends of a pair of electric motors hung from axles in the well-known way which shall have certain of its operating portions common to both motors, so as to provide means whereby reactive tendency of one motor to rotate as a whole in a given direction around its axle shall be made to neutralize the reactive force of the other motor, there being also yielding means provided tending to prevent such motion of either or both of the motors, the said invention being an improvement upon the device described and illustrated in the patent granted to Benjamin R. Van Kirk November 4, 1902, for improved supporting devices for electric motors, No. 712,981.

The above object I attain as hereinafter set forth, reference being had to the accompanying drawings, in which—

Figure 3:
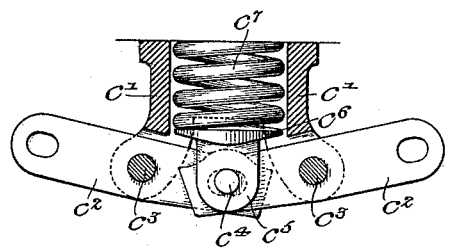
Figure 4:
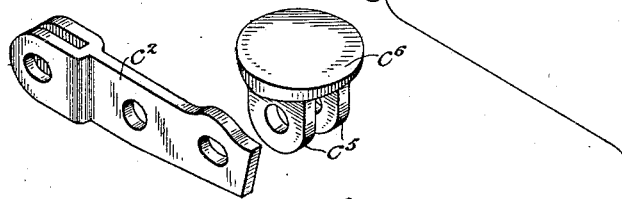
Figure 5:
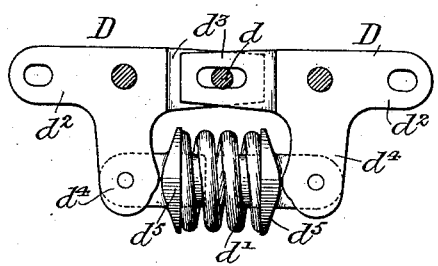

Figure 1 is a diagrammatic elevation of the traction-wheels of a vehicle in which is indicated the position of the motors relatively thereto and which shows the detail construction of my improved means for suspending the adjacent ends of said motors to accomplish the above-noted object. Fig. 2 illustrates a slightly-modified form of the invention. Fig. 3 is a sectional elevation showing the detail construction of the suspending mechanism illustrated in Fig. 1. Fig. 4 is a detached perspective view of parts of my invention shown in Fig. 3. Fig. 5 is a side elevation of the special form of the invention shown in Fig. 2, and Fig. 6 is a special form of the construction shown in Fig. 1.

In the above drawings, A and A' represent, respectively, the two main axles of an electric vehicle, each of which has traction-wheels $a$ and a gear-wheel $a'$, the latter being indicated in dotted lines and the whole being shown as inclosed in gear-cases $a^2$. Hung to the shafts A and A' are electric motors B and B', respectively, having upon their armature-shafts pinions indicated in dotted lines at $b'$ and in the present instance being provided with lugs $b$, which project from their free or otherwise-unsupported ends.

C indicates a pair of beams supported in any desired manner from the truck of the vehicle and connected in the construction illustrated in Fig. 1 by a channel-section $c$, to the under side of which is fixed a casting $c'$. Levers $c^2$ are pivoted at $c^3$ to lugs on said casting, one arm of each lever being pinned to the lug $b$ of its adjacent motor, while a common pin $c^4$ passes through elongated slots in the opposite ends of each of the levers, this pin also engaging lugs $c^5$, projecting from a plate $c^6$. Between this plate and the channel $c$ is confined a relatively heavy spiral spring $c^7$.

If found advisable, I may modify the piece $c'$, as shown in Fig. 6, at $c^8$, so as to place a spring $c^7$ under as well as over the levers $c^2$, said spring being then confined between a second plate $c^6$ and the bottom portion $c^8$ of the piece $c'$.

In the modified form of my device shown in Figs. 2 and 5 three-armed levers D, carried by a structure C', hung from the vehicle-truck by one or more supension-pieces C², are employed in place of the lever-bars $c^2$, (shown in Fig. 1,) one arm $d^2$ of each of said levers being directly connected to the lug $b$ of its adjacent motor, while the second arm $d^3$ of one of the levers is loosely held to a similar arm of the second lever by means of a pin $d$. The levers are pivoted to their supporting structure at $d^6$, and their third arms $d^4$ extend substantially parallel to each other, having confined between them a spring $d'$, held between two plates $d^5$.

The action of both of the above-described devices is the same in any case, since, for example, if the motor B' is supplied with current, so that the reaction due to its revolution tends to revolve it around the axle A' in the direction of the arrow $x$, such tendency is opposed by the spring $c^7$, which is compressed to a greater or less degree by means of the lever $c^2$. Movement of this lever $c^2$ upon its pivot $c^3$ also moves the second lever $c^2$ upon its pivot simultaneously with the compression of the spring and tends to move the motor B downwardly around the axle A as an axis. This motor, however, being also supplied with current tends to revolve around the shaft A in the direction of the arrow $y$, so that the result of the construction is that the reaction of one motor balances that of the other. Should only one motor be operated or should their reactive tendencies be unequal, the difference in either case would be taken care of by the spring $c^7$, which acts to minimize motion of the levers $c^2$, and consequently of the motors connected thereto. In the same manner the motors connected as shown in Figs. 2 and 5 would be caused to act against one another, since the upward tendency of one would counterbalance the downward tendency of the other through the medium of the substantially horizontal arms $d^3$ of the levers D, while, as before, movement resulting from this tendency, as well as from inequality in the action of the motors, would be opposed by the spring $d'$, which would be compressed to a greater or less degree between the third arms $d^4$ of said levers.

I claim as my invention—

1. The combination of a motor, a supporting structure, arms having pivotal connection with each other and connected to the motor, and a spring or springs placed to resist motion of the arms, said arms being pivotally attached to said supporting structure, substantially as described.

2. The combination of two motors, a supporting structure, arms connected to each other and each attached to one of the motors, said arms being pivotally carried by the structure, with a spring or springs placed to resist motion of the arms, substantially as described.

3. The combination of two motors, a supporting structure, a bar for each motor pivotally supported by said structure, a pivotal connection between said bars and a spring or springs placed to oppose motion of the bars on their pivots, substantially as described.

4. The combination of a support, two motors, a shaft operatively connected to each of said motors and partially supporting the same, a lever pivotally attached to each motor, and carried by said support, said levers being pinned together and having a common spring or springs placed to oppose motion of the motors bodily around their shafts, substantially as described.

5. The combination of two motors with a supporting structure, a pivotally-supported bar for each motor carried by said structure, a pivotal connection between said bars, certain of the connections being slotted to permit motion of the bars on their pivots and a spring or springs placed to oppose such motion of the bars, substantially as described.

6. The combination of two motors having means whereby they are supported in such manner that they tend to revolve as a whole when in operation, a three-armed lever for each motor, one arm of each lever being connected to one of the motors, the second arm of one of the levers being connected to one of the arms of the other lever, and a spring or springs operative upon the remaining arms of the levers, substantially as described.

7. The combination of two electric motors having supporting means, two three-armed levers having certain of their arms pivoted together, an arm of each lever pivoted to the motor adjacent thereto, the third arm of each lever extending substantially parallel to the corresponding arm of the other lever with a spring or springs between said arms, substantially as described.

8. The combination with two electric motors, of two levers, one lever being pivotally connected to one motor and the other to the second motor, with a spring or springs acting between certain arms of said levers and placed to oppose bodily motion of the motors, and means independent of the motors and spring for supporting said levers, substantially as described.

9. The combination with two electric motors, of two levers, one lever being pivotally connected to one motor and the other to the second motor, with a spring or springs acting on certain arms of said levers and placed to oppose bodily motion of the motors, said levers being pivotally connected together, and having means whereby they are supported independently of the motors and the spring, substantially as described.

In testimony whereof I have signed my name to this specification in the presence of two subscribing witnesses.

WALTER O. WEBSTER.

Witnesses:
JAS. H. M. HAYS,
WILLIAM DE KRAFFT.